(12) United States Patent
Scarbrough

(10) Patent No.: X3873
(45) Date of Patent: May 19, 1824

(54) LEVER POWER, &C

(76) Inventor: William Scarbrough

William [illegible]

Letters Patent

The schedule referred to in these Letters Patent and making part of the same containing a description in the words of the said William [illegible] of his improvement in the mode of [illegible] vessels.

I claim as a patent and exclusive right for ever the application of the principle of the arch whether vertically, horizontally, diagonally applied in the placing or arrangement of the wood iron copper or other material in the construction or building of ships, or other vessels of any description; and also in the roofing of houses [illegible] [illegible] used in all cases of lateral or other pressure. The annexed plan is a partial illustration of the principle as regards the lateral pressure to the decks of vessels when rolling or pitching and plainly manifests that the use of knees and [illegible] as the manner heretofore used may be entirely dispensed with and augmented strength acquired and by diagonal application bringing into use planks of such short lengths as would otherwise be unable to impart even a [illegible] and strength. The application of the same principle may be made highly useful in the [illegible] and framing of vessels, and in their external planking; but particularly in the ceiling or internal planking as each plank acts as a brace to every [illegible] and [illegible] in a diagonal or angular direction instead of the old horizontal or straight forward manner. The outer deck planks may be sheathed with [illegible] planks or boards [illegible] and grooved and [illegible] nailed, adding [illegible] [illegible] preservation to the lower deck and an ornament to the vessel.

In large vessels where great strength in the [illegible] is required, a special and particular advantage is manifest, both in the saving of timber and the additional strength acquired by the division of the [illegible] into [illegible] and the more especially as the longitudinal [illegible] to [illegible] them may by their proper insertion be made to serve as [illegible] [illegible] in the resistance of vertical pressure. The application to roofing will enable the roofing of buildings no matter how wide at the least [illegible]

United States Patent

Patent No.: X3873

[illegible] that can be observable to taste a Concession and Security from
external violation or not, and in a stranger manner have been before
[illegible] in [illegible] Carolina Georgia March 25 1824

Witnesses

[illegible] A. Ampfield

[illegible] G. W. [illegible] Lindsey

William Vanburgh

[illegible]

[illegible] 1423

DRAFTSMAN'S DIVISION.

*All communications should be addressed to*
"The Commissioner of Patents.
Washington, D. C."

2—328 a.

DEPARTMENT OF THE INTERIOR,

United States Patent Office,

Washington, D. C., ............, 189...

SIR:

The printed ...... Copies ...... of Patent No. W. Scarburgh

...... are ...... exhausted. May 19 1824

As soon as printed a copy will be mailed you to complete your order.

By direction of the Commissioner:

Very respectfully,

Chief Clerk.

814306-97-5m